UNITED STATES PATENT OFFICE 2,624,753

5-N-BUTOXY-1-HEXYL ADIPATE AND METHOD FOR MAKING THE SAME

William S. Emerson and Raymond I. Longley, Jr., Dayton, Ohio, assignors to Monsanto Chemical Company, St. Louis, Mo., a corporation of Delaware No Drawing. Application June 30, 1948, Serial No. 36,263

2 Claims. (Cl. 260—485)

This invention relates to the preparation of valuable plasticizers from readily available raw materials, and to various intermediates in the preparation thereof. More specifically the invention relates to new esters which are prepared from butadiene.

The primary purpose of this invention is to provide new chemical compounds useful in plasticizing resinous compositions, particularly polyvinyl chloride and copolymers of at least 70 percent of vinyl chloride and up to 30 percent of other polymerizable monomers, such as vinyl acetate and other vinyl esters of monocarboxylic acids, ethyl maleate, ethyl fumarate, and other alkyl esters of maleic and fumaric acids. A further purpose is to provide methods of preparing the new compounds and various intermediates heretofore unknown.

In the practice of this invention butadiene is used as the principal raw material and it is first converted to an alkoxychloroalkene by reaction with an alkyl α-chloroethyl ether or an alkyl chloromethyl ether, which may readily be prepared by reaction of an alkyl alcohol with either acetaldehyde or formaldehyde, respectively, and hydrochloric acid or by the addition of hydrogen chloride to a vinyl ether. Further details of this step of synthesis are set forth in the following specific examples.

Example 1

A mixture of 5 gram moles of methyl chloromethyl ether and 20 grams of fused zinc chloride was placed in a 1-liter, 3-necked, round-bottom flask provided with a rotary stirrer, a thermometer, and a gas inlet tube. The flask and its contents were cooled in an ice bath. Butadiene was then introduced into the mixture at a rate that permitted the maintenance of a temperature between 0° C. and 20° C. When the solution was saturated with butadiene the reaction was interrupted, but the stirring was continued with the addition of aqueous sodium carbonate for the purpose of washing out the catalyst and destroying the excess of the chloro ether. The reaction mass was then separated and the organic phase diluted with benzene and washed with water. After drying, the product was fractionally distilled and two separate compounds were obtained, which were identified as 5-methoxy-3-chloro-1-pentene and 5-methoxy-1-chloro-2-pentene.

Example 2

Using the procedure identical to that set forth in the preceding example butadiene was condensed with ethyl chloromethyl ether, n-propyl chloromethyl ether, n-butyl chloromethyl ether, n-pentyl chloromethyl ether, 3-methylbutyl chloromethyl ether, ethyl α-chloroethyl ether, n-butyl α-chloroethyl ether and isobutyl α-chloroethyl ether. In each case two isomeric compounds were obtained which were separated by fractional distillation.

The following table sets forth the identification of all the compounds prepared in accordance with Examples 1 and 2, with physical constants observed.

| Compound | B. P., °C./mm. | $n_D^{25}$ | $d_{25}^{25}$ |
|---|---|---|---|
| 5-Methoxy-3-chloro-1-pentene | 49/19 | 1.4345(20) | 0.973(20) |
| 5-Methoxy-1-chloro-2-pentene | 71/20 | 1.4512 | 0.998 |
| 5-Ethoxy-3-chloro-1-pentene | 65/21 | 1.4370 | 0.959 |
| 5-Ethoxy-1-chloro-2-pentene | 77/19 | 1.4460 | 0.971 |
| 5-n-Propoxy-3-chloro-1-pentene | 77.5/19 | 1.4380 | 0.946 |
| 5-n-Propoxy-1-chloro-2-pentene | 90/19 | 1.4445 | 0.951 |
| 5-n-Butoxy-3-chloro-1-pentene | 60/1 | 1.4400 | 0.931 |
| 5-n-Butoxy-1-chloro-2-pentene | 74/1 | 1.4485 | 0.943 |
| 5-(3'-Methyl)butoxy-3-chloro-1-pentene | 92/3 | 1.4440 | 0.929 |
| 5-(3'-Methyl)butoxy-1-chloro-2-pentene | 109/5 | 1.4485 | 0.935 |
| 5-(2'-Chloroethoxy)-1-chloro-2-pentene | 84/2 | 1.4735 | 1.130 |
| 5-n-Butoxy-3-chloro-1-hexene | 67.5/3 | 1.4386 | 0.917 |
| 5-n-Butoxy-1-chloro-2-hexene | 83/3 | 1.4490 | 0.931 |
| 5-Isobutoxy-3-chloro-1-hexene | 44/1 | 1.4321 | 0.900 |
| 5-Isobutoxy-1-chloro-2-hexene | 56/1 | 1.4449 | 0.922 |
| 5-n-Amyloxy-3-chloro-1-pentene | 71/2 | 1.4367 | 0.908 |
| 5-n-Amyloxy-1-chloro-2-pentene | 85/2 | 1.4517 | 0.937 |

It has been found that in the preparation of plasticizers the alkyl chloromethyl ethers and the alkyl α-chloroethyl ethers having from 1 to 5 carbon atoms in the alkyl group are most useful, and the alkoxyalkenyl chlorides prepared by condensation with butadiene will have the following structures:

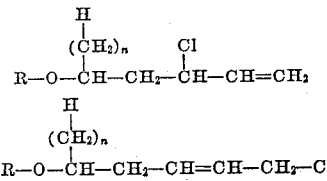

wherein R is an alkyl or cycloalkyl radical having up to 5 carbon atoms, and n is zero (0) or one (1). As explained above the butadiene condensation produces a substantial portion of both isomeric forms.

In the production of plasticizers it has been found that the isomer having the terminal chlorine atom is most useful, since it develops more desirable properties in the plasticized resin compositions. Accordingly, it is advantageous to improve the yield of the 1-chloro-derivative and to decrease the production of the 3-chloro-derivative. The practice of this invention involves an isomerization reaction whereby the less desirable 3 - chloro - derivative is converted substantially quantatively into the 1-chloro-derivative. This is accomplished by separating the two isomers by an efficient fractional distillation and treating the 3-chloro-derivative by heating in the presence of an acid catalyst, for example zinc chloride, stannic chloride, copper chlorides, ferric chloride, aluminum chloride, sulfuric acid, boron fluoride, phosphoric acid, and other Friedel-Crafts type catalysts, whereby the 3-chloro-isomer is rearranged to form a substantial proportion of the 1-chlor-isomer. The mixture so obtained is further fractionated and the 3-chloro-isomer returned for further isomerization. This chemical reaction is readily adaptable to a continuous distillation procedure and virtually quantitative yields of the isomer having a chlorine atom on the terminal carbon atom may be obtained. Further details of the practice of this isomerization are set forth with respect to the following specific examples.

*Example 3*

A 136 gram quantity of 5-n-pentyloxy-3-chloro-1-pentene was mixed with 10 cc. of a 20 percent zinc chloride solution in ether. On standing at room temperature for 20 hours the refractive index of the mixture at 25° C. changed from 1.4360 to 1.4415. The mixture was diluted with 100 cc. of benzene, washed with dilute sodium hydroxide solution and distilled at 3.5 mm., the fraction boiling above 80° C. being separated. The product was found to be approximately an equimolar mixture of the 5-n-pentyl-oxy-3-chloro-1-pentene and an isomeric compound identified as 5-n-pentyloxy-1-chloro-2-pentene.

*Example 4*

A 231 gram quantity of 5-ethoxy-3-chloro-1-hexene was mixed with 3 cc. of a 20 percent solution of zinc chloride in ether. After allowing the mixture to stand for 24 hours, it was heated to 120° C. and then cooled. The mixture was diluted with an equal volume of benzene, washed with dilute sodium hydroxide and distilled at 25 mm. to recover a 180 gram quantity of product, boiling between 62° C. and 92° C. The fraction so separated was then redistilled through a 130 cm. Vigreux column. One hundred thirty-two grams of product was recovered and identified as 5-ethoxy-1-chloro-2-hexene.

In the further practice of this invention the alkoxy-chloroalkenes may be converted to the corresponding alcohols by hydrolysis. The mixed alkoxy chloroalkenes or the separated isomers may be so treated. Thus, the hydrolysis reaction is useful in preparing compounds of the following structures:

$$\text{R}-\text{O}-\overset{\overset{\text{H}}{|}}{\underset{\underset{(\text{CH}_2)_n}{|}}{\text{C}}}\text{H}-\text{CH}_2-\overset{\overset{\text{OH}}{|}}{\text{C}}\text{H}-\text{CH}=\text{CH}_2$$

$$\text{R}-\text{O}-\overset{\overset{\text{H}}{|}}{\underset{\underset{(\text{CH}_2)_n}{|}}{\text{C}}}\text{H}-\text{CH}_2-\text{CH}=\text{CH}-\text{CH}_2-\text{OH}$$

wherein R is an alkyl or cycloalkyl radical having up to 5 carbon atoms, and $n$ is a small whole number from zero (0) to one (1), inclusive.

The hydrolysis reaction may be conducted by heating the alkoxychloroalkenes with water in the presence of a basic substance whereby a hydroxyl group is substituted for the chlorine atom. Further details of the preparation of these unsaturated alcohols are set forth with respect to the following specific examples.

*Example 5*

A mixture of 1250 cc. of water, 190.5 grams of the mixed isomeric n-butoxychlorohexenes, and 130 grams of sodium carbonate were heated at 100° C. for seventeen and one-half hours with constant stirring. After the reaction mixture was cooled it was extracted twice with 200 cc. portions of benzene. The combined benzene extractions were distilled at 19 mm. total pressure and a substantial yield of mixed n-butoxyhexenols was obtained by separating the fraction boiling between 110° C. and 138° C.

*Example 6*

Using the procedure described in Example 5, 126 grams of 5-n-pentyloxy-1-chloro-2-pentene was hydrolyzed and the crude product carefully distilled through a Lecky-Ewell column. A substantial portion of an unsaturated alcohol was separated and identified as 5-n-pentyloxy-2-penten-1-ol.

*Example 7*

Using the procedure described in Examples 5 and 6, other unsaturated chlorides were hydroyzed and the following compounds isolated and identified.

| Compound | B. P., ° C./mm. | $n_D^{25}$ | $d_{25}^{25}$ |
|---|---|---|---|
| 5-Methoxy-2-penten-1-ol | 96–98/19 | 1.4480 | 0.966 |
| 5-n-Butoxy-1-penten-3-ol | 98–99/14 | 1.4375 | 0.894 |
| 5-n-Butoxy-2-penten-1-ol | 121–122/13 | 1.4460 | 0.909 |
| 5-n-Pentyloxy-1-penten-3-ol | 120–121/20 | 1.4426 | 0.905 |
| 5-n-Pentyloxy-2-penten-1-ol | 143/29 | 1.4498 | 0.901 |
| 5-Ethoxy-1-hexen-3-ol | 82–83/14 | 1.4318 | 0.896 |
| 5-Ethoxy-2-hexen-1-ol | 101–103/12 | 1.4477 | 0.923 |
| n-Butoxyhexenols | 110–138/19 | | |
| Isobutoxyhexenols | 90–95/2.5 | 1.4414 | |
| 5-Isobutoxy-2-hexen-1-ol | 106/16; 90/1.5 | 1.4435 | 0.899 |

The unsaturated alcohols described in Examples 5 through 7 may be hydrogenated to form a useful class of intermediates, which are the corresponding saturated alcohols. The hydrogenations are conducted under presure at temperatures between 50 and 200° C. in the presence of a suitable hydrogenation catalyst, for example nickel, platinum, palladium, etc. It is usually desirable to conduct the hydrogenations in the presence of a diluent, such as ethyl alcohol, methyl alcohol, dioxane, ethyl acetate, or other common solvents or in solution in the product. Further details of the practice of this step of the invention are set forth with respect to the following specific examples.

*Example 8*

Two hundred grams of 5-n-butoxy-2-penten-1-ol was charged with 20 grams of Raney nickel into a stainless steel high pressure reaction vessel, to which was then added gaseous hydrogen to a pressure of 1250 pounds per square inch. The vessel was then shaken for one hour and a half while maintaining the vessel at a temperature between 75 and 100° C. During the reaction the pressure dropped to 400 pounds per square inch. The contents of the vessel was then filtered to remove the catalyst, diluted with ethyl alcohol and mixed with 50 cc. of aqueous potassium carbonate solution. Careful distillation of the non-aqueous phase produced 156 grams of a saturated alcohol identified as 5-n-butoxy-1-pentanol.

Example 9

Using a procedure identical to that described in Example 8, various other alkoxyalkenols were hydrogenated to produce new alkoxypentanols and alkoxyhexanols as follows:

| Compounds | B. P., °C./mm. | $n_D^{25}$ | $d_{25}^{25}$ |
|---|---|---|---|
| 1-n-Butoxy-3-pentanol | 98–99/14 | 1.4290 | 0.891 |
| 5-n-Butoxy-1-pentanol | 90–94/2 | 1.4334 | 0.891 |
| 5-n-Pentyloxy-1-pentanol | 139–141/20 | 1.4357 | 0.884 |
| 2-Ethoxy-4-hexanol | 79–80/15 | 1.4190 | 0.879 |
| 5-Ethoxy-1-hexanol | 99–101/12 | 1.4318 | 0.903 |
| 2-n-Butoxy-4-hexanol | 103.5–104.5/15 | 1.4270 | 0.870 |
| 5-n-Butoxy-1-hexanol | 127.5/15 | 1.4335 | 0.882 |
| 2-Isobutoxy-4-hexanol | 98–99/14 | 1.4317 | 0.895 |
| 5-Isobutoxy-1-hexanol | 120–121/15 | 1.4305 | 0.875 |

In the practice of this invention the new class of esters which have unusually desirable properties when used to plasticize polyvinyl chloride or copolymers of vinyl chloride may be prepared by the reaction of the above described alkoxychloroalkenes with salts of dicarboxylic acids having from 6 to 10 carbon atoms, such as adipic acid, suberic acid, sebacic acid, pimelic acid, azelaic acid, phthalic acid, terephthalic acid and isophthalic acid. The esters, which have unsaturation derived from the alkoxychloroalkenes may also be prepared by the esterification of the dicarboxylic acids with the alkoxlalkenols described above. Such esterification reactions are preferably conducted in the presence of water insoluble organic liquid, such as benzene or toluene at reflux temperatures with continuous removal of the evolved water using a Dean and Stark trap.

Esters of the dicarboxylic acids having from 6 to 10 atoms and the alkoxyalkanols may be prepared by the hydrogenation of the unsaturated esters described in the preceding paragraph or by the esterification of the dicarboxylic acids with the saturated alcohols described above. The hydrogenation reaction is preferably conducted under pressure and in the presence of a suitable solvent and hydrogenation catalyst. Direct esterifications are preferably conducted at reflux temperature in the presence of an inert organic solvent with continuous removal of the evolved water, and in the presence of a suitable esterification catalyst.

The esters which are prepared in accordance with the invention, are valuable plasticizers and may be represented by the following structural formula:

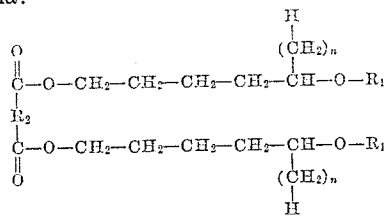

wherein $R_1$ is an alkyl group having from 1 to 5 carbon atoms, $R_2$ is a divalent hydrocarbon radical having from 4 to 8 carbon atoms, and $n$ is a small whole number from zero (0) to one (1), inclusive.

Further details of these methods of preparing esters are set forth in the following specific examples.

Example 10

A round-bottom flask provided with a reflux condenser was charged with 96 grams of powdered sodium adipate, 176.5 grams of 5-n-butoxy-1-chloro-2-pentene and 3 cc. of triethyl amine. The mixture was heated for four hours at 162 to 170° C. The reaction mass was cooled, diluted with a large excess of benzene, and filtered. The filtrate was distilled at 0.7 mm. to a pot temperature of 200° C., and the residue then further distilled in a Hickman still at a pressure of $2 \times 10^{-4}$ to $10^{-5}$ mm. A substantial yield was obtained of a compound identified as 5-n-butoxy-2-penten-1-ol adipate.

Example 11

The compound prepared in accordance with the preceding example was charged to a hydrogenation bomb with 25 grams of Raney nickel in 50 cc. of ethanol. Gaseous hydrogen was added to a pressure of 1200 pounds per square inch and the bomb maintained at a temperature between 90 and 100° C. for seventy minutes. After cooling the mixture was filtered to remove the catalyst and then distilled at 30 mm. pressure to a temperature of 210° C. The residue was dissolved in ether and washed with aqueous sodium carbonate. After the ether was evaporated by a water bath the residue was fractionally distilled in a Hickman still and a substantial yield of a saturated ester was obtained and thereafter identified as 5-n-butoxy-1-pentyl adipate.

Example 12

A mixture of 58 grams of 5-n-butoxy-1-hexanol, 25 grams of adipic acid, and 30 cc. of toluene was heated at 175 to 200° C. for fifteen and one-half hours. The evolved water was collected continuously in a Dean and Stark trap. Upon cooling the reaction mixture was diluted with 200 cc. of benzene, washed with 100 cc. of a 10 percent sodium hydroxide solution and dried over potassium carbonate. Upon distillation a substantial yield of a compound identified as 5-n-butoxy-1-hexyl adipate was recovered.

Example 13

Using the procedure described in Examples 10 through 12 additional preparations were made and new esters separated and identified. The following table sets forth these compositions with their critical physical characteristics.

| Compound | B. P., °C./mm. | $n_D^{25}$ | $d_{25}^{25}$ |
|---|---|---|---|
| 5-n-Butoxy-2-penten-1-yl adipate | | 1.4604 | 0.901 |
| 5-n-Butoxy-1-pentyl adipate | 182–190/0.10 | 1.4466 | 0.983 |
| 5-n-Butoxy-1-pentyl terephthalate | 230–238/0.35 | 1.4836 | 1.008 |
| 5-n-Pentyloxy-1-pentyl adipate | 202–204/0.15 | 1.4474 | 0.952 |
| 5-Ethoxy-1-hexyl phthalate | 197–201/0.2 | 1.4829 | 1.032 |
| 5-n-Butoxy-1-hexyl adipate | 214–218/0.5 | 1.4460 | 0.950 |
| 5-Isobutoxy-1-hexyl adipate | 205–215/0.8 | 1.4433 | 0.947 |
| 5-Isobutoxy-1-hexyl 4'-ketopimelate | 229–235/0.3 | 1.4480 | 0.974 |

In addition to the esters there are other valuable plasticizing compounds which can be prepared from butadiene and either the alkylchloromethyl ethers or the alkyl α-chloroethyl ethers by procedures analogous to those described in the preceding examples. Such compounds are the amides which are derived from the saturated and unsaturated amines analogous to the alcohols described in the preceding examples. Thus, the alkoxy-chloroalkenes may be reacted with an alkyl amine to form the secondary amine, an N-alkylalkoxyalkenyl amine, or the corresponding saturated amine, an N-alkyl-5-alkoxyalkyl amine. Such amines will have the structural formula:

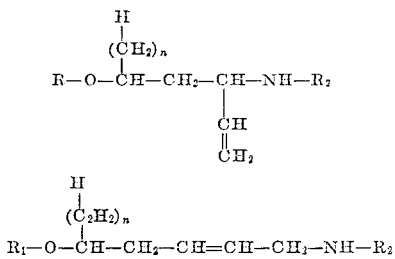

wherein $R_1$ is an alkyl radical having up to 5 carbon atoms, $R_2$ is the alkyl radical derived from the amine, and $n$ is a small whole number from zero (0) to one (1), inclusive. In the preparation of these secondary amines, the primary amines which may be used are the alkyl amines, such as methyl amine, ethyl amine, the various propyl amines, the butyl amines, 2-ethylhexyl amine and homologues thereof, especially those containing up to 12 carbon atoms. The new amines are prepared by heating the alkoxychloroalkenes with the alkyl amines until combination is effected. Further details of the preparation of these new compositions are set forth in the following specific example.

*Example 14*

A mixture of 149 grams of 5-ethoxy-3-chloro-1-pentene and 438 grams of n-butyl amine was heated at reflux temperature for eight hours. Upon cooling the product was shaken with a solution of 50 grams of sodium hydroxide in 250 cc. of water. The non-aqueous phase which separated was distilled at 12 mm. pressure and the fraction boiling between 92 and 115° C. was separated. Re-distillation at 15 mm. pressure and 101° produced a product identified as N-(n-butyl)-5-ethoxy-1-pentenyl-3-amine.

The corresponding saturated amines may be prepared by hydrogenation procedures preferably under pressure in the presence of a suitable hydrogenation catalyst. Further details of this modification are set forth with respect to the following specific example.

*Example 15*

A sample of N-(n-butyl)-5-ethoxy-2-pentenyl-1-amine was dissolved in ethyl alcohol and treated with hydrogen at 800 pounds per square inch pressure and 75° C. in the presence of a Raney nickel catalyst. Distillation of the resulting product yielded N-(n-butyl)-5-ethoxy-1-pentyl amine.

Useful amides may be prepared from the novel saturated and unsaturated amines described in the immediately preceding example by use of conventional organic synthesis techniques.

The most desirable aspect of this invention is the preparation of the esters and their use in plasticizing vinyl chloride polymers. The superiority of these esters to other esters known and used in the art was demonstrated by comparing dibutyl-cellosolve adipate and the dibutoxyamyl adipate of this invention. The two plasticizers were milled with 200 percent by weight of polyvinyl chloride and the resulting compositions compared by standard procedures adapted to demonstrate the flexibility at low temperatures and the volatility of the plasticizer when subjected to moderate and prolonged heating. The flexibility of the composition at low temperatures was determined by cooling the polymer sample to about −60° C. and observing the change in the modulus of rigidity as the sample warms up to room temperatures, the flex temperature being that at which the modulus of rigidity is 135,000 pounds per square inch. The volatility test is conducted by heating the composition at 105° C. for twenty-five hours and measuring the percent of plasticizer evolved. These tests demonstrate the relative utility of the composition, for example if it is to be subjected to outside weather conditions flex temperatures as low as −20 to −30° are desirable and if the polymer is to be subjected to elevated temperatures, a volatility of 5 to 10 percent is advantageous. Obviously lower flex temperatures and lower volatilities may materially extend the range of utility of the compositions.

The dibutylcellosolve adipate, which is widely used in the plasticizing field was found to have a flex temperature of −47.3° C. and a volatility of 12.5 percent. The dibutoxyamyl adipate was found to have a low flex temperature of −51° C. and a very greatly improved volatility of 6.4 percent. Thus, it is apparent that the new class of compositions are definitely superior to the prior art composition, most nearly resembling it chemically and structurally. To the best of the applicants' knowledge and belief this superiority extends throughout the entire range of compositions claimed.

We claim:
1. 5-n-butoxy-1-hexyl adipate.
2. A method of preparing 5-n-butoxy-1-hexyl adipate which comprises refluxing a mixture of adipic acid and 5-n-butoxyhexanol-1, condensing the evolved vapors, separating the water from the condensate, and returning the non-aqueous fraction to the refluxing mixture.

WILLIAM S. EMERSON.
RAYMOND I. LONGLEY, Jr.

REFERENCES CITED

The following references are of record in the file of this patent:

UNITED STATES PATENTS

| Number | Name | Date |
|---|---|---|
| 2,118,506 | Graves | May 24, 1938 |